Feb. 25, 1964 S. M. TERRY ETAL 3,122,360
SEAT OR CUSHION OF COMBINED SPRINGS AND RESILIENT
PAD CONSTRUCTION
Filed March 7, 1960
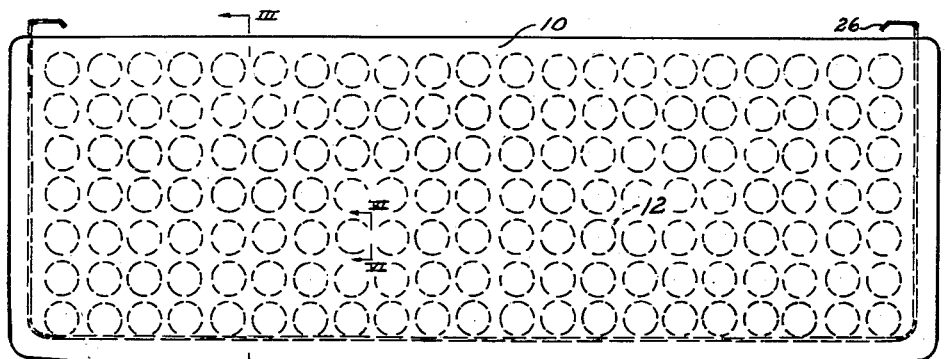
fig. 1.
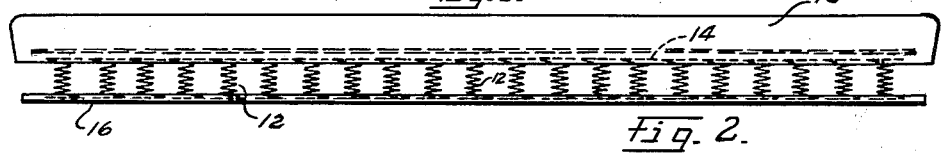
fig. 2.
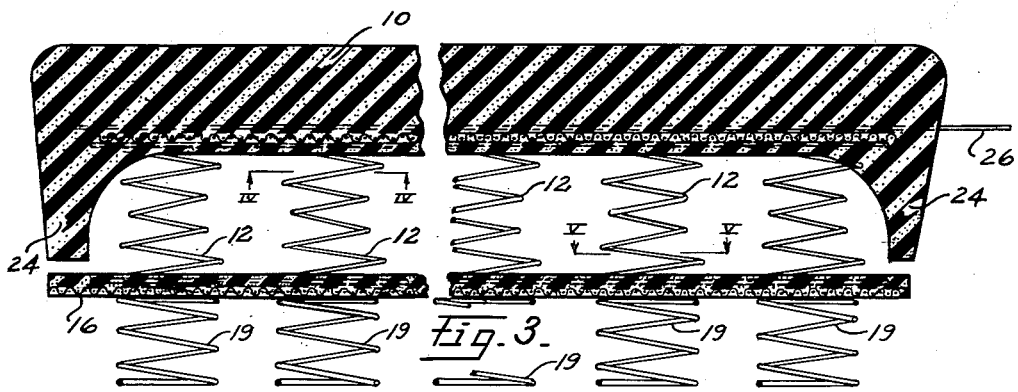
fig. 3.
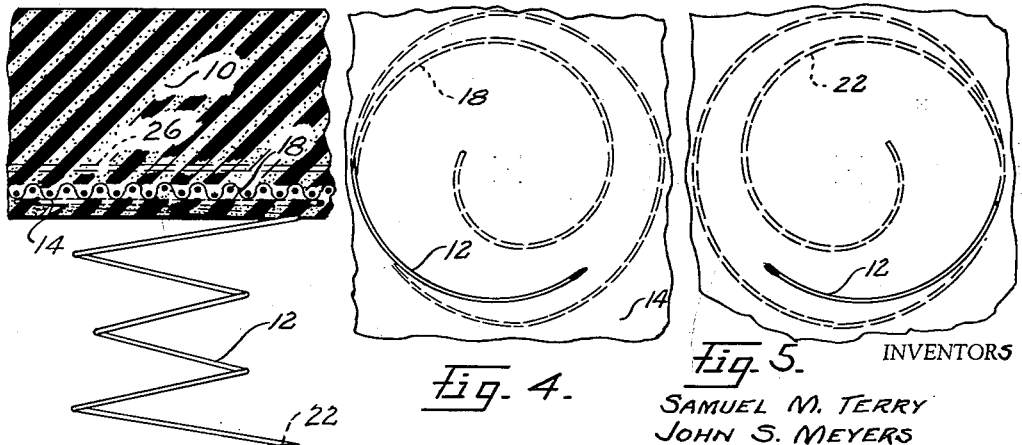
fig. 4.   fig. 5.
fig. 6.
INVENTORS
SAMUEL M. TERRY
JOHN S. MEYERS
BY 
ATTORNEY

United States Patent Office 3,122,360
Patented Feb. 25, 1964

3,122,360
SEAT OR CUSHION OF COMBINED SPRINGS AND
RESILIENT PAD CONSTRUCTION
Samuel M. Terry, Ann Arbor, and John S. Meyers, Allen Park, Mich., assignors to Stubnitz Greene Corporation, Adrian, Mich., a corporation of Michigan
Filed Mar. 7, 1960, Ser. No. 13,002
3 Claims. (Cl. 267—84)

The present invention relates to improvements in spring wire coil assemblies and method of making the same, for the seats and backs of vehicles, furniture, and the like, as well as general purpose resilient supporting surfaces such as mattresses, cushions, and the like. More specifically, the invention is concerned with the provision of a relatively thin, highly flexible and resilient spring wire coil assembly in which spring wire coils are associated with a slab of resilient foam material, the slab functioning to locate and support one end of the coils as well as to insulate the coils from the load supporting surface of the slab.

It has been proposed, as disclosed in United States Patent No. 2,874,389, to embed opposite ends of spring coils in spaced slabs of polyurethane foam to provide a reversible inner spring foam mattress. As described in the aforesaid patent, polyurethane foam adheres strongly to the metallic surface of the spring coils. Polyurethane foam also has a chemical reaction with fibrous woven fabric to improve the structural properties of the fabric as disclosed in pending application Serial No. 672,278, filed July 16, 1957.

In carrying out the present invention it is proposed to combine the slab, woven insulator and spring coils into a unitary structure. In practice, the assembly takes the form of a slab of polyurethane foam which, in the mold, reacts against and through an openwork fabric and about one end of the spring wire coils to bond the fabric and coils into the body of the slab of foam material. The chemical reaction of the foam with the fabric improves its structural properties and assures the support of the coils against penetration into the body of the foam slab under conditions of use experienced in vehicle seats and backs. The ends of the coils opposite those attached to the foam slab are preferably attached to an inexpensive base which may be either relatively flexible or relatively rigid, depending upon the nature of support that is required for the superstructure.

In vehicle seating, it is proposed to use closely woven 10 oz. burlap for the base for the spring wire coils, the coils being attached to the burlap base by a suitable adhesive. Preferably, the coils are attached to the burlap base by applying a layer of polyurethane foam to a surface of the burlap then positioning the ends of the coils against the burlap, embracing the ends of the coils in the foam and curing the foam. Aside from the firm bonding of the ends of the coils to the closely woven burlap, the polyurethane foam will penetrate the interstices of the burlap to improve the structural characteristics of the same. Thus treated, the burlap base may rest directly upon a subbase of spaced resilient spring elements of the vehicle seating structure. In place of the closely woven burlap, the ends of the coils opposite the ends attached to the foam slab, may be attached to a base of paper, cardboard, fiberboard, wood, plywood, sheet metal, or the like.

In carrying out the method of manufacture of the present invention, the spring wire coils are supported upon a suitable fixture to uniformly space and support the same. While supported upon the fixture, the open-mesh fabric is imposed upon the exposed ends of the coils to confine the coils between the fixture and the fabric. This assembly is then inverted and suspended in the mold for the foam slab, the fabric being spaced above the bottom of the mold a distance approximating the thickness of the cured slab. As the chemical reaction takes place in the mold, the foam is leveled and distributed by the openwork fabric with a portion of the foam passing through the fabric and embracing the ends of the coils. Following a precure in the mold the foam slab, openwork fabric insulator and spring wire coil assembly is removed from the mold. The base may thereafter be applied to the ends of the coils opposite the foam slab either after final cure or directly after the precure.

Thus, an object of the invention is to provide improvements in components used in seating structure and methods of making the same in which a flexible slab of cellular reaction material has integrally associated therewith an insulator, a plurality of spring wire coils and a base structure.

Another object is to provide an improved spring wire coil assembly having an upper slab of flexible polyurethane foam, the lower surface of the slab having an openwork fabric embedded therein and a plurality of spring wire coils having one end disposed against the fabric and embedded in the foam of the slab penetrating the fabric.

A further object is to provide a method of embedding spring wire coils in a flexible slab of cellular reaction material involving the step of disposing a flexible openwork sheet between the reaction material and coils, the sheet acting as an insulation between the coils and the slab and leveling the reaction material during expansion while permitting a portion of the reaction material to penetrate the sheet and embrace the ends of the coils.

A still further object of the invention is to provide a spring wire coil assembly comprising a plurality of coils having opposite ends of the coils embedded in layers of polyurethane foam carried upon sheets of flexible material.

Another object is to provide a spring wire coil assembly comprising a plurality of coils having opposite ends of the coils attached to spaced sheets, at least one of which is flexible, the ends of the coils being bonded in position.

These and other objects and advantages residing in the present invention will more fully appear from a consideration of the following specification and the appended claims.

In the drawings,
FIG. 1 is a plan view of an assembly embodying the invention,
FIG. 2 is a front view of FIG. 1,
FIG. 3 is a cross-sectional view taken on line III—III of FIG. 1,
FIG. 4 is a fragmentary view taken on line IV—IV of FIG. 3 showing one embedded end of a coil,
FIG. 5 is a view similar to FIG. 4 taken on line V—V of FIG. 3 showing the other end of an embedded end of a coil, and
FIG. 6 is a fragmentary enlarged cross-sectional view taken on line VI—VI of FIG. 1.

Referring to the drawings, the resilient seating or cushion assembly illustrating the invention comprises a slab 10, spring coils 12, an insulator 14 between the coils 12 and slab 10, and a base or back 16.

The slab 10 is preferably of flexible polyurethane foam in which a woven, open-mesh fabric of cotton, jute or other suitable strands constituting the insulator 14 is embedded along with one or more of the end convolutions 18 of the spring coils 12. In practice, the foam forming the slab 10 is expanded through the open mesh of the insulator 14 and embraces the convolutions 18. Upon curing the foam, the insulator 14 and the end convolutions 18 of the coils 12 are bonded to the slab 10.

The base or back 16 may be flexible, rigid or semi-rigid. If the base 16 is to be resiliently supported upon a subbase of a seat cushion in an automobile, for example, in such event the base 16 would be flexible. In FIG. 3, such a subbase is indicated by coil springs 19. A flexible base 16 may be accomplished by using 10 oz. woven burlap 20 and bonding the one or more of the end convolutions 22 of the coils 12 to the burlap 20. Any suitable bonding material may be used for attaching the convolutions 22 to the burlap 20 such as latex and resin cements. In practice, it has been found that coating the burlap 20 with a layer of uncured polyurethane foam, embedding the convolutions 22 in the foam and curing the assembly gives satisfactory results with the chemical reaction between the burlap and foam improving the structural characteristics of the burlap 20.

One method for fabricating the assembly of FIGS. 1 and 2 is to first insert the spring coils 12 in a suitable fixture having a series of uniformly spaced pockets into which the coils 12 may be inserted with a substantial portion of each coil spring extending out of each pocket. To help hold the coils 12 in the pockets when the fixture is inverted, the woven open-mesh insulator 14 is laid over the exposed ends of the coils 12 and it may be marginally attached to the fixture. The fixture, with the coils 12 held in the pockets by the insulator 14, may now be inverted and suspended in a suitable manner in the mold for the slab 10 with the insulator 14 being spaced from the bottom of the mold a distance equal to the central thickness of the slab 10.

With the insulator 14 and coils 12 disposed in the mold in the manner described above, the chemicals for producing the foam are placed in the mold. As the foam expands it will be leveled by the insulator 14 with a portion of the foam passing through the interstices of the insulator 14 and embracing the end convolutions 18 of the coils 12. As it may be desirable to have a skirt 24 of foam about the marginal edges of the slab 10, the insulator 14 does not extend to the sides of the mold to permit foaming to take place to a greater extent around the vertical sides of the mold to provide the skirt 24. Where a frame element is desired in the slab 10, such as the U-frame wire 26, it may be supported in the mold and embedded in the foam as shown. Following the completion of the foaming operation in the mold and a precure of the foam, the fixture is removed and the coils 12 and insulator 14 are now an integral part of the slab 10. Thereafter, the base or back 16 may be bonded to the free end of the coils 12.

In lieu of bonding the coils 12 to the base or back 16 after molding of the slab 10, it will be readily appreciated that with a rigid or semi-rigid base or back 16 as, for example, where sheet metal or plywood is substituted for the burlap 20, the base or back 16 may function as the fixture for the coils 12. With this arrangement the coils 12 would be bonded in the desired spaced relation upon the sheet metal or plywood, the insulator 14 would be laid over the free ends of the coils 12 and attached to the marginal edges of the base or back 16 and the assembly would be inserted into the mold in the same manner as the fixture described above.

Where the bonding material for the convolutions 22 of the base or back 16 is polyurethane foam, the precure of the same would take place either before or after the molding of the slab 10 and the final cure of both the slab 10 and the base or back 16 would be carried out as a single operation.

The preparation, formulation, molding and curing of polyurethane foam is well known in the art and forms no part of the present invention except in the sequence of steps claimed.

Having thus described our invention, what we claim is:

1. A spring coil assembly comprising a plurality of laterally spaced coils, a flexible foam slab, a loosely woven fabric disposed between said slab and said coils, and a common bonding material for bonding said fabric and coils to said slab.

2. A spring coil assembly as defined in claim 1 wherein said bonding material is a homogeneous part of said slab.

3. In combination with a supporting surface defined by separate spring elements, a spring coil assembly supported upon said spring elements, said assembly comprising a flexible closely woven burlap fabric directly disposed upon said spring elements, a plurality of coils disposed in spaced relation upon said fabric, means bonding the end convolutions of said coils to said fabric, a loosely woven fabric disposed upon the opposite ends of said coils, a flexible foam slab disposed on said loosely woven fabric, a common bonding material for bonding said loosely woven fabric and said opposite ends of said coils to said slab.

References Cited in the file of this patent

UNITED STATES PATENTS

| | | |
|---|---|---|
| Re. 24,914 | Koenigsberg | Dec. 20, 1960 |
| 2,283,116 | Young | May 12, 1942 |
| 2,398,237 | Marsack | Apr. 9, 1946 |
| 2,459,120 | Sprargren | Jan. 11, 1949 |
| 2,775,287 | Mantegna | Dec. 25, 1956 |
| 2,785,440 | Toulmin | Mar. 19, 1957 |
| 2,882,959 | Burkart | Apr. 21, 1959 |

FOREIGN PATENTS

| | | |
|---|---|---|
| 562,189 | France | Aug. 28, 1923 |
| 1,164,827 | France | May 19, 1958 |
| 824,244 | Germany | Dec. 10, 1951 |